United States Patent [19]
Chen

[11] Patent Number: 5,852,661
[45] Date of Patent: Dec. 22, 1998

[54] ADAPTIVE ECHO CANCELLATION USED WITH ECHO SUPPRESSION TO REDUCE SHORT AND LONG DURATION ECHOES

[75] Inventor: Herbert M.K. Chen, Austin, Tex.

[73] Assignee: Advanced Micro Devices, Inc., Sunnyvale, Calif.

[21] Appl. No.: 390,320

[22] Filed: Feb. 17, 1995

[51] Int. Cl.$^6$ .................................................. H04M 1/00
[52] U.S. Cl. .......................... 379/406; 379/406; 379/409; 379/411
[58] Field of Search ...................................... 379/406, 409, 379/411, 410, 388, 389, 390, 3; 370/32.1, 32

[56] References Cited

U.S. PATENT DOCUMENTS

| | | | |
|---|---|---|---|
| 4,539,674 | 9/1985 | Carlquist et al. | 370/32.1 |
| 4,707,824 | 11/1987 | Kanemasa | 379/410 |
| 5,014,263 | 5/1991 | Valravan et al. | 370/32.1 |
| 5,075,687 | 12/1991 | Chen et al. | 341/110 |
| 5,134,658 | 7/1992 | Chen et al. | 381/46 |
| 5,193,112 | 3/1993 | Sano | 370/32.1 |
| 5,343,521 | 8/1994 | Jullien et al. | 379/411 |
| 5,428,681 | 6/1995 | Andre | 379/406 |

*Primary Examiner*—Dwayne Bost
*Assistant Examiner*—Keith Ferguson
*Attorney, Agent, or Firm*—Foley & Lardner

[57] ABSTRACT

A DECT Base Station Unit for canceling hybrid echoes and suppressing network echoes. The DECT Base Station Unit includes a hybrid that connects a two-wire loop to a four-wire loop, an adaptive balance filter that receives a near-end transmit signal over two wires of the four-wire loop and receives a residual error signal over another two wires of the four-wire loop. The adaptive balance filter outputs an hybrid echo negating signal to a adder. The adder also receives an output from the hybrid that includes a transmit far-end signal and a reflected portion of the near-end transmit signal, and the adder outputs a residual error signal. The DECT Base Station Unit further includes an echo suppressor, an echo suppressor controller for controlling an attenuation level of the echo suppressor, and a decorrelation controller for sending enable/disable signals to the echo suppressor controller and the adaptive balance filter based on a level of correlation between the near-end transmit signal and the residual error signal.

21 Claims, 7 Drawing Sheets

FIG. 7A
| Terminating Loop Condition | Excitation Signal Level (dBm0) | G.227 Telephone Noise (mid-band) Adaptive Balance | SRL-LO (dB) 200-500 Hz Adaptive Balance | SRL-HI (dB) 2500-3400 Hz Adaptive Balance |
|---|---|---|---|---|
| 600 ohm | -5 | +33 | +37 | +31 |
|  | -10 | +29 | +37 | +27 |
|  | -20 | +27 | +34 | +27 |
|  | -30 | +25 | +25 | +23 |
| EIA3 | -5 | +32 | +30 | +24 |
|  | -10 | +32 | +25 | +23 |
|  | -20 | +30 | +25 | +27 |
|  | -30 | +25 | +25 | +21 |
| EIA5 | -5 | +35 | +30 | +25 |
|  | -10 | +32 | +25 | +33 |
|  | -20 | +31 | +28 | +30 |
|  | -30 | +28 | +30 | +23 |
FIG. 7B
FIG. 7C
FIG. 7D

ADAPTIVE ECHO CANCELLATION USED WITH ECHO SUPPRESSION TO REDUCE SHORT AND LONG DURATION ECHOES

BACKGROUND OF THE INVENTION

1. Field of the Invention

The invention relates to controlling echoes in digital cordless telephone systems. More specifically, the invention relates to the use of an adaptive echo canceler together with an adaptive echo suppressor to eliminate both short and long duration echoes.

2. Description of the Related Art

The invention herein, and the inventions disclosed and claimed in U.S. Pat. Nos. 5,014,263, 5,134,658, and 5,075,687, all incorporated herein by reference, generally relate to noise cancellation and echo suppression using digital techniques.

FIG. 1 shows a basic hookup of a Digital European Cordless Telephone (DECT) system. The DECT base station unit 30 is connected on one end via a two-wire telephone loop 45 to a Central Office or Exchange 85. The Central Office or Exchange 85 includes a hybrid $H_{EX}$ 80. The other end of the DECT base station unit 30 is connected to a four-wire telephone loop (not shown), which receives signals over the air from a DECT Mobile Unit Handset 5.

An important component of the DECT base station unit 30 is a hybrid (H) 10. The Hybrid H 10 is a device that is the interface for the two-wire to four-wire conversion, or the four-wire to two-wire conversion. The hybrid H 10 acts as a means for sending and receiving signals between two-wire and four-wire systems.

During telephone conversations using the DECT system, there are two major types of echoes: hybrid echoes and network echoes. There is also a third type of echoes, namely acoustic echoes, which occur due to signals entering both the mouthpiece and the earpiece of a telephone, but these echoes are typically not nearly as much as a problem as the other two types of echoes.

Hybrid echoes are echoes that are a result of an impedance mismatch at the DECT base station hybrid H 10, since that is where the two-wire to four-wire conversion, or four-wire to two-wire conversion, takes place. Referring again to FIG. 1, a Transmit signal X 20 from a near-end source (DECT Mobile Unit 5) travels from the four-wire loop, through the hybrid H 10, over to the two-wire loop 45, and eventually reaches the far-end source FES 50. A near-end source is a source that is typically relatively close to the DECT Base Station Unit 30, and a far-end source is a source that is typically far away from the DECT Base Station Unit 30.

Impedance mismatch at the DECT base station hybrid H 10 causes some of the near-end transmit signal X 20 to be reflected back to the near-end source 5. This is shown in FIG. 1 as reflected signal $X_{REFL}$ 40. Therefore, not all of the near-end transmit signal X 20 reaches the far-end source 50. More importantly, the reflected-back signal $X_{REFL}$ 40 causes noise and other undesirable interference problems at the near-end source 5, and techniques have been established to lessen and/or eliminate the hybrid echo. The worst-case hybrid echo scenario is an open loop condition where the two-wire loop 45 is not connected to the hybrid H 10. In the open loop case, a total reflection of the near-end transmit signal X 20 back to the near-end source 5 occurs.

A conventional method of eliminating hybrid echoes includes the use of an adaptive echo canceler. One type of adaptive echo canceler is an adaptive, finite impulse response (FIR) digital filter, or balance filter B 90, having an impulse response matched to the hybrid echo delay pattern.

An adaptive balance filter B 90 continuously adjusts its coefficients to optimize its transfer function. Without the adaptation feature, a user must calculate the filter coefficients for the most-commonly-encountered hybrid echo characteristics, and then choose the closest set of coefficients suited to the particular connection desired. The selected set generally does not provide the best echo cancellation under most circumstances, and is generally ineffective if the two-wire and/or four-wire loop impedances vary with time.

On the other hand, with an adaptive balance filter B 90, the user need not perform any calculations. As a result, the user gets a continuously updated echo-cancellation function which can respond to changing line and/or speech characteristics. The adaptive balance filter B 90 receives both the near-end transmit signal, X 20, and the residual error signal, E 190, and based on these two signals, adjusts its filter characteristics to eliminate the near-end transmit signal components of the residual error signal E 190.

Hybrid echoes are typically on the order of zero to four milliseconds in duration. For this length of echo, an adaptive balance filter works exceedingly well in canceling the echo to allow for clear transmission and reception to and from the near-end and far-end sources 5, 50.

Another type of echo, called a network echo, is a secondary echo, and has a duration of anywhere from about four milliseconds to 200 milliseconds or more. Since network echoes are long delay echoes, adaptive echo cancellation techniques, such as those using adaptive balance filters requiring a large number of filter taps, are not economical when trying to cancel network echoes.

A network echo path, which is a result of an impedance mismatch at the far-end hybrid $H_{FE}$ 60, is shown in FIG. 1. Some of the near-end transmit signal $X_{NET}$ 70 that is incident at the far-end hybrid $H_{FE}$ 60 reflects back to the DECT base station unit 30, and this reflected signal is shown as signal $X_{NETREFL}$ 70 in FIG. 1. Network echoes have long delay times due to the various transmission medium in which the echo must travel to return back to the DECT base station unit 30 and eventually back to the DECT Mobile Handset 5.

Although an adaptive FIR filter can in theory eliminate a 100 millisecond or longer network echo, it would require about 800 or more taps in the FIR filter (assuming a typical sampling rate of 8 kHz or so), thereby resulting in great cost and complexity for a DECT base station unit 30 that has such a multi-tap FIR filter.

As mentioned previously, network echoes occur as a result of the distances that the near-end signal $X_{NETREFL}$ 70 that is reflected back at the far-end hybrid $H_{FE}$ 60 due to an impedance mismatch must travel before it reaches the DECT base station unit 30. For example, if the DECT base station unit 30 communicates to the far-end user 50 over a satellite (not shown), the time delay resulting from a reflected signal $X_{NETREFL}$ 70 having to travel from the far-end hybrid $H_{FE}$ 60 on the surface of the Earth, to a geosynchronous satellite located approximately 22,300 miles above the Earth's surface, and back to the DECT base station unit 30 on the surface of the Earth can be very unpleasant to both the near- and far-end users of the telephone. In addition, any echo caused by this end-to-end signal delay makes communication between the near-end user and the far-end user both cumbersome and noisy.

Since echo cancellation techniques are not very attractive for eliminating network echoes, echo suppression techniques have been utilized to reduce the effects of network echoes. A conventional echo suppressor is described in detail in U.S. Pat. No. 5,075,687.

Conventional DECT base station units cannot appropriately handle both short duration hybrid echoes and long duration network echoes. Adaptive digital balancing filters work well for canceling short duration echoes, but become exceedingly complex and expensive if they are to be designed to cancel long duration echoes. Similarly, echo suppressors work well in suppressing long duration echoes, but they do not especially work well in negating short duration echoes.

SUMMARY OF THE INVENTION

Accordingly, it is an object of the invention to provide an apparatus that can effectively and economically lessen both hybrid echoes and network echoes.

In accordance with this object, there is provided according to the invention a telephone base station apparatus for a DECT system. The apparatus according to the invention includes a hybrid for connecting a two-wire telephone loop to a four-wire telephone loop. The hybrid has a first port that receives a near-end transmit signal from the four-wire loop, a second port that receives a far-end transmit signal from the two-wire loop, and a third port that outputs an output signal on the four-wire loop. The output signal contains a first amount of the far-end transmit signal and a second amount of the near-end transmit signal. The first and second amounts are determined based on the impedance mismatch between the two-wire loop and the four-wire loop at the hybrid.

The apparatus according to the invention further includes an adaptive balance filter with a first input port that receives the near-end transmit signal, a second input port, and an output port that outputs an hybrid echo canceling signal. The apparatus according to the invention also includes a summer having an addition port connected to the output port of the adaptive balance filter, a subtraction port connected to the third port of the hybrid, and an output port that outputs a residual error signal according to the hybrid echo cancellation signal minus the output signal. The residual error signal is connected to the second input port of the adaptive balance filter, and the adaptive balance filter adjusts its internal coefficients to eliminate a part of the output signal that contains a reflected amount of the near-end transmit signal.

The apparatus according to the invention still further includes a decorrelation controller connected in parallel with the adaptive digital filter. The decorrelation controller has a first input port that receives the near-end transmit signal, a second input port that is connected to receive the residual error signal, and an output port that outputs an enable/disable signal to the adaptive digital filter according to an amount of correlation between the near-end transmit signal and the residual error signal.

The apparatus according to the invention also includes first and second voice level detectors respectively connected to receive the residual error signal and the near-end transmit signal, and respectively outputting a first and second detection result. The apparatus according to the invention still further includes an echo suppressor controller connected to receive the first and second detection result and the enable/disable signal through an inverter as an inverted enable/disable signal. The apparatus according to the invention also includes an echo suppressor that is connected to the output port of the summer and that is connected to receive the control signal from the echo suppressor controller, wherein the echo suppressor applies an amount of attenuation to the residual error signal received from the summer according to the control signal.

BRIEF DESCRIPTION OF THE DRAWINGS

The invention is set forth with particularity in the appended claims. The invention, together with further objects and advantages thereof, may best be understood by making reference to the following description taken in conjunction with the accompanying drawings, wherein:

FIGS. 7A, 7B, 7C and 7D show test results using the invention and with different types of noise sources.

DETAILED DESCRIPTION OF THE PREFERRED EMBODIMENT

Figure 1:
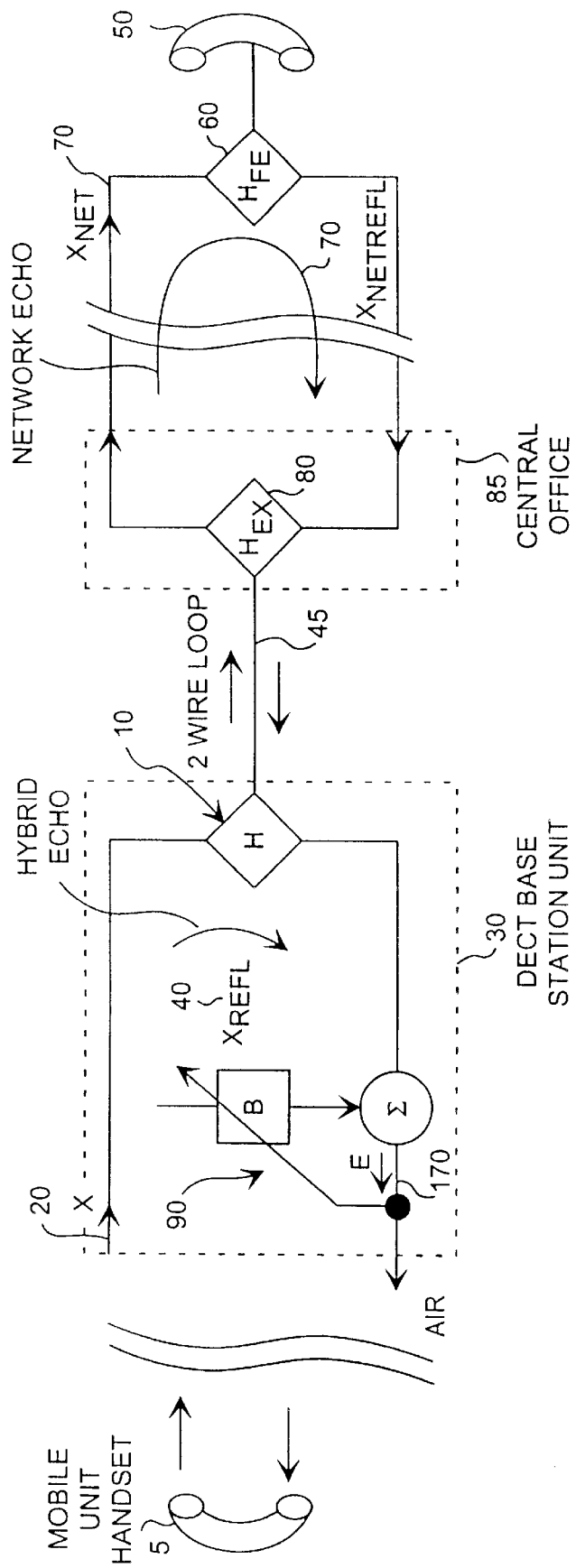
FIG. 1 shows a conventional hookup of a DECT telephone system, utilizing a DECT base station, and showing a hybrid echo and a network echo.
Figure 2:
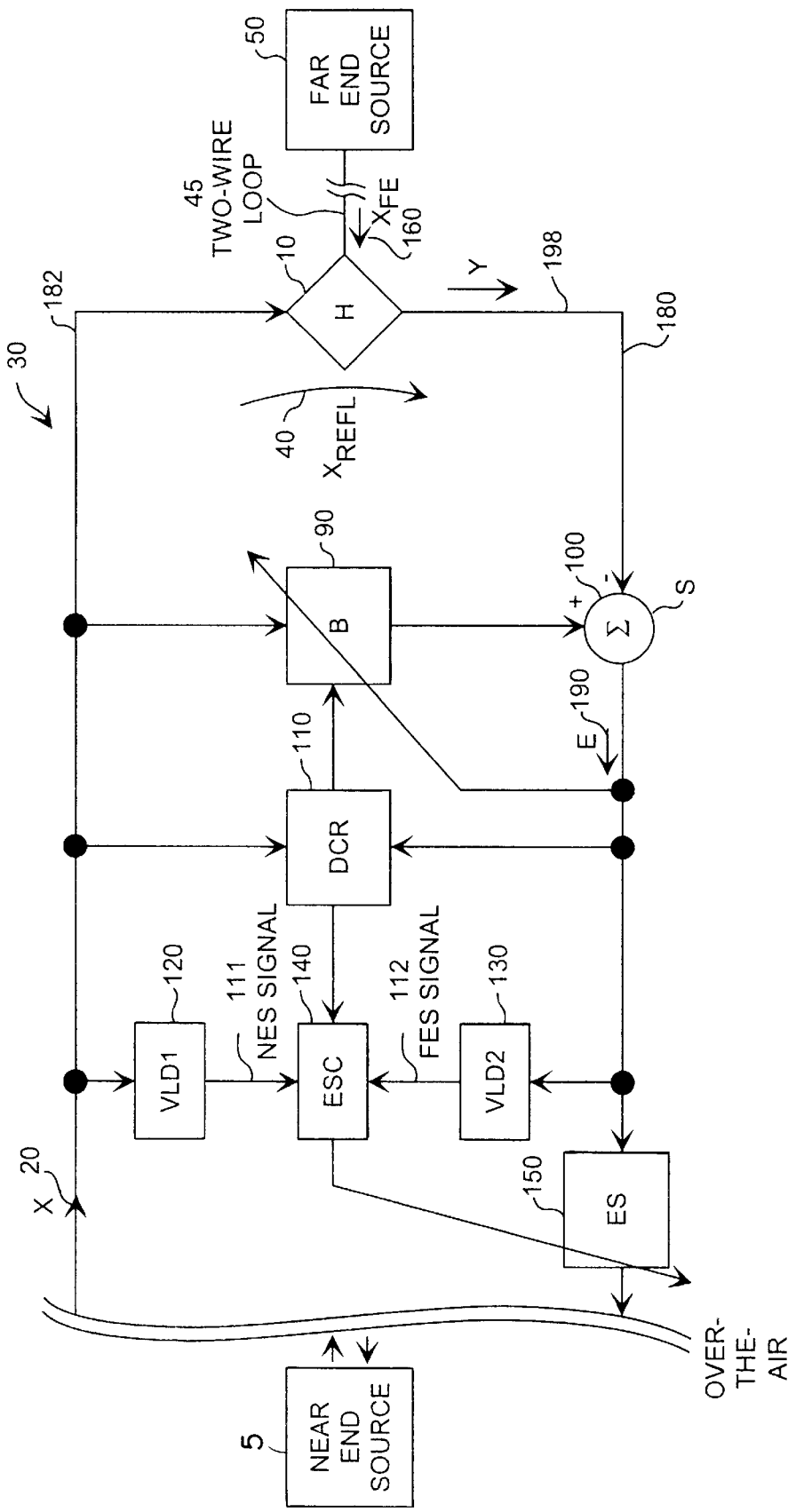
FIG. 2 shows a DECT base station unit according to the invention.

A DECT base station unit 30 according to the invention is shown in FIG. 2. The DECT base station unit 30 includes a hybrid (H) 10, a balance filter (B) 90, a summer (S) 100, a decorrelation controller (DCR) 110, a first and second voice level detector (VLD1) 120, (VLD2) 130, an echo suppression controller (ESC) 140, and an echo suppressor (ES) 150. Based on these devices and signals sent to and from these devices, both hybrid and network echoes can effectively be controlled at the DECT base station unit 30.

The hybrid H 10 is the component that interfaces between the two-wire loop 45, which connects to the far-end source 50, and the four-wire loop 180, 182, which connects to the near-end source 5 via an over-the air signal transmission and reception.

The hybrid H 10 receives the near-end transmit signal X 20 from line 182 of the four-wire loop onto one of its ports, and outputs that signal to the far-end source 50 on another of its ports to the two-wire loop 45. Due to impedance mismatches between the two-wire and four-wire loops, some of the near-end transmit signal X 20 gets reflected back to the near-end source 5. This is shown in FIG. 2 as the reflected signal $X_{REFL}$ 40. A far-end receive signal $X_{FE}$ 160 is received at the hybrid H 10, and sent to the near-end source 5 through one of the ports of the hybrid H 10 as signal Y 198 via the line 180 of the four-wire loop. The DECT base station unit 30 thereby allows two-way communication between the near-end source 5 and the far-end source 50.

An adaptive balance filter B 90 is connected to receive the near-end transmit signal X 20 on one of the lines 182 of the four-wire loop, and is connected to receive a residual error signal E 190 on another of the lines of the four-wire loop.

Figure 3:
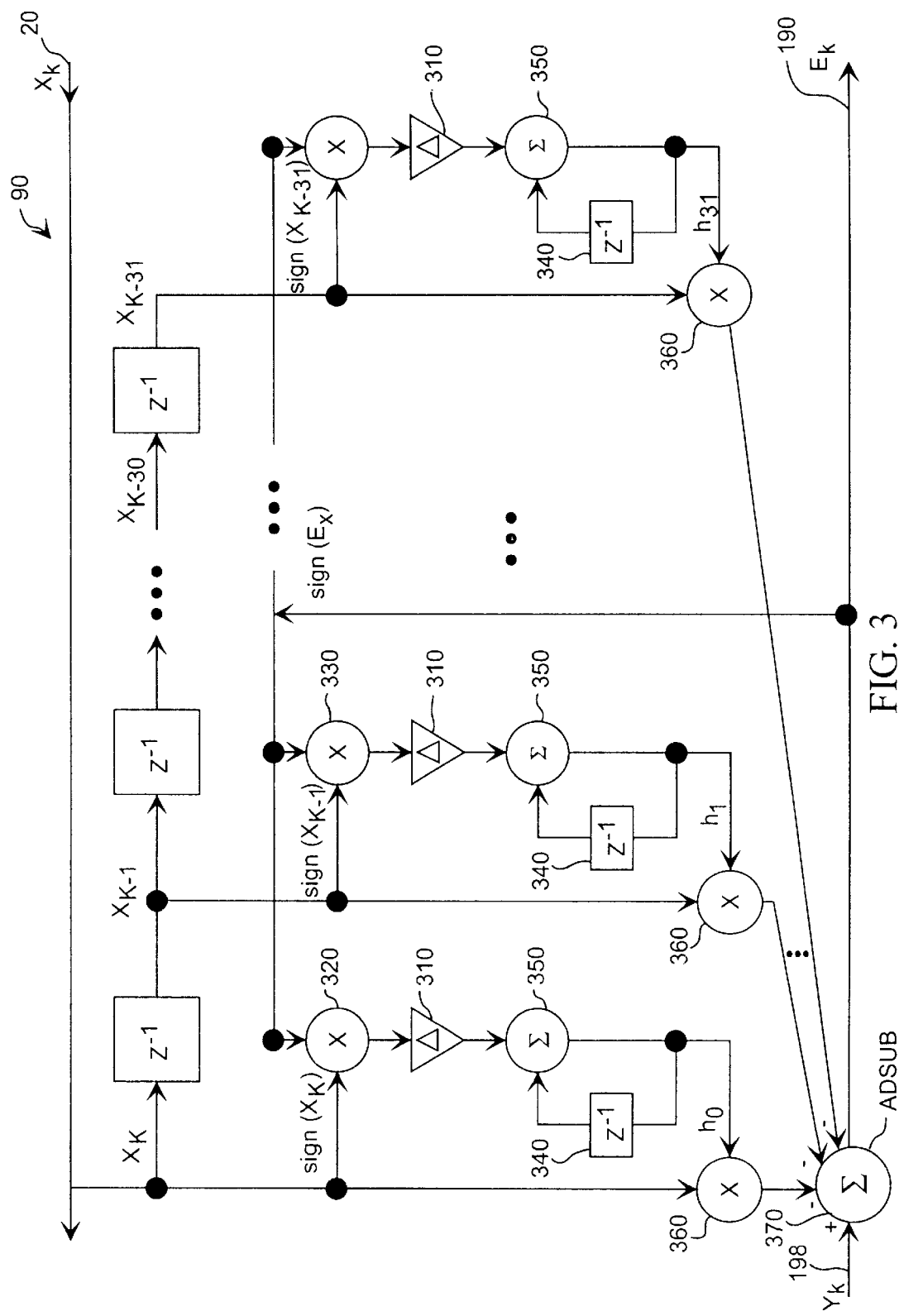
FIG. 3 shows an adaptive balance filter according to the invention.

An adaptive balance filter B 90 that can be used according to the invention is shown in FIG. 3 as a finite impulse response (FIR) digital filter. Based on the near-end transmit signal X 20 and the residual error signal E 190, the adaptive balance filter B 90 adjusts its tap coefficients, $h_0, h_1, \ldots, h_n$, according to the following equation:

$$h_{kj} = h_{k-1,j} + \Delta * \text{Sign}|E_k| * \text{Sign}|X_{k-j}|,$$

where $h_{kj}$, j=0, ..., n corresponds to the n tap weights of the adaptive balance filter B 90, Δ 310 corresponds to an adaptation step size (e.g., Δ=0.00025), $E_k$ corresponds to a $k^{th}$ sample of the residual error signal E 190, $X_{k-j}$ corresponds to the k-$j^{th}$ sample of the near-end transmit signal X 20, and Sign |Z| corresponds to the sign of a value Z, i.e, Sign |5|=+1, Sign |-3|=-1. The adaptive balance filter B 90 utilizes a "sign" algorithm to adjust its tap weights, which is a well-known procedure to one of ordinary skill in the art. Other methods of performing adaptation can be utilized while remaining within the teachings of the invention, such as a conventional amplitude multiplication between the samples of X 20 and E 190 at each of the taps.

The near-end transmit signal X 20 is received at the left-most tap 320 of the n taps of the adaptive balance filter B 90 in FIG. 3. The signal X 20 is shown as $X_k$. The terminology $X_k$ means the $k^{th}$ sample of the near-end transmit signal X 20. Each of the n taps holds a sample of the transmit signal X 20, but at varying instants in time. The current sample of X 20 (in this case, the $k^{th}$ sample of X 20), called $X_k$, is input to the left-most tap 320. At the next sample instant, i.e., the $(k+1)^{th}$ sample instant, the sample $X_k$ is sent to the tap 330 immediately to the right of the left-most tap 320 of the adaptive balance filter B 90, and sample $X_{k+1}$ is sent to the left-most tap 320. This procedure is done in a "bucket-brigade" manner for all n taps. As a result, the adaptive balance filter B 90 holds a short-term "history" of the transmit signal X 20 in its n taps (after n samples of X 20 have been read into the n taps of the filter B 90). By way of example and not limitation, an adaptive balance filter B 90, shown as used according to the invention in FIG. 2, has thirty-two (32) taps, which respectively hold the last thirty-two samples $X_k$, $X_{k-1}$, $X_{k-2}$, ..., $X_{k-31}$, of the near-end transmit signal X 20.

The adaptive balance filter B 90 multiplies the sign of each of the last 32 samples of X 20 by the sign of the residual error signal E 190 at each of the respective thirty-two taps. The sign multiplication result at each tap is then multiplied by Δ 310, which corresponds to the adaptation step size. That result is then added to the most-previous version of the tap weight, as shown by the $z^{-1}$ delay elements 340 and the adders 350. The resulting tap weight $h_k$ computed for each of the thirty-two taps is then multiplied by the corresponding $X_k$ at multipliers 360, and sent to a respective subtraction port of an adder/subtracter ADSUB 370. Along with these thirty-two taps output values, a latest sample $Y_k$ of the signal Y 198 received from the DECT hybrid H 10 is added thereto, to arrive at the residual error signal $E_k$ (that is, the value of E 190 at sample instant k).

The multiplication of the signs of the two signals X 20 from the line 182 and E 190 from the line 180 at each tap of the adaptive balance filter B 90 gives an amount of correlation between these two signals. The basic theory underlying correlation is that if two signals are totally uncorrelated, the sum of the multiplication of the two signals over a period of time will be zero. It is also true that if the sum of the multiplication of the sign of two signals approaches zero, then the two signals are nearly decorrelated.

Generally, sign multiplication calculations are much simpler to perform than amplitude calculations, and have the same effect if the sum is integrated over a long enough period of time. Therefore, the FIR adaptive balance filter B 90 as shown in FIG. 3 utilizes a sign algorithm to detect an amount of correlation between the near-end transmit signal X 20, and the return signal E 190. The adaptive balance filter B 90 decorrelates the echo residual from the return signal E 190 by adjusting its filter coefficients, or tap weights $h_0$, $h_1$, ..., $h_n$.

Referring back to FIG. 2, the residual error signal E 190 should ideally only represent the far-end receive signal $X_{FE}$ 160. Since the far-end receive signal $X_{FE}$ 160 and the near-end transmit signal X 20 come from two different sources, they should be independent of each other. Therefore, if the residual error signal E 190 consists of only the far-end receive signal $X_{FE}$ 160, the process performed by the adaptive balance filter B 90 should result in little, if any, balancing being performed by the adaptive balance filter B 90.

However, if the residual error signal E 190 includes only the reflected near-end signal $X_{REFL}$ 40 as a result of an impedance mismatch at the hybrid H 10, or if the residual error signal E 190 contains some near-end speech X 20 as a result of the hybrid echo as well as far-end speech $X_{FE}$ 160, then there will be some adaptive balancing performed by the adaptive balance filter B 90. This adaptive balancing eliminates or reduces the reflected near-end speech component $X_{REFL}$ 40 from the residual error signal E 190.

The amount of balancing needed is based on the correlation between the residual error signal E 190 and the near-end transmit signal X 20. If there is a high degree of correlation between these two signals, the adaptive balance filter B 90 eliminates a large amount of the residual error signal E 190. The correlated portion of the residual error signal E 190 is the hybrid echo, which is an undesired, reflected, near-end signal component of the signal Y 198 obtained on the line 180 of the four-wire loop.

Referring again to FIG. 3, an example of typical values used by an adaptive balance filter B 90 are thirty-two taps and a sample rate of 8 kHz. The sample rate of 8 kHz means that the near-end transmit signal X 20 is sampled every 8 KHz, or ⅛₀₀₀=125 microseconds. Since thirty-two samples (i.e., the number of taps) of the near-end transmit signal X 20 are stored in the adaptive balance filter B 90 at any given time, this means that the adaptive balance filter B 90 has the ability to cancel echoes that are 125 microseconds * 32=4 milliseconds or shorter. Four milliseconds is typically the longest duration of hybrid echoes encountered in digital telephony.

Referring again to FIG. 2, the output of the adaptive balance filter B 90 is fed to a sum (+) port of the summer S 100. The third port of the DECT hybrid H 10 that is connected to the line 180 of the four-wire loop outputs a signal Y 198 which may contain some or all of the far-end receive signal $X_{FE}$ 160, as well as some of the near-end signal X 20, due to impedance mismatch at the DECT hybrid H 10. This signal Y 198 is input to a subtraction (−) port of the summer S 100. The output of the summer S 100 corresponds to the residual error signal E 198, which is input to the adaptive balance filter B 90 in a feedback loop structure, in order to eliminate or reduce the portion of the receive signal Y 198 that is correlated with the near-end transmit signal X 20.

In essence, the adaptive balance filter B 90 and the summer S 100 together act as a means for stripping off a portion of the receive signal Y 198 that is correlated with the near-end transmit signal X 20.

Figure 4:
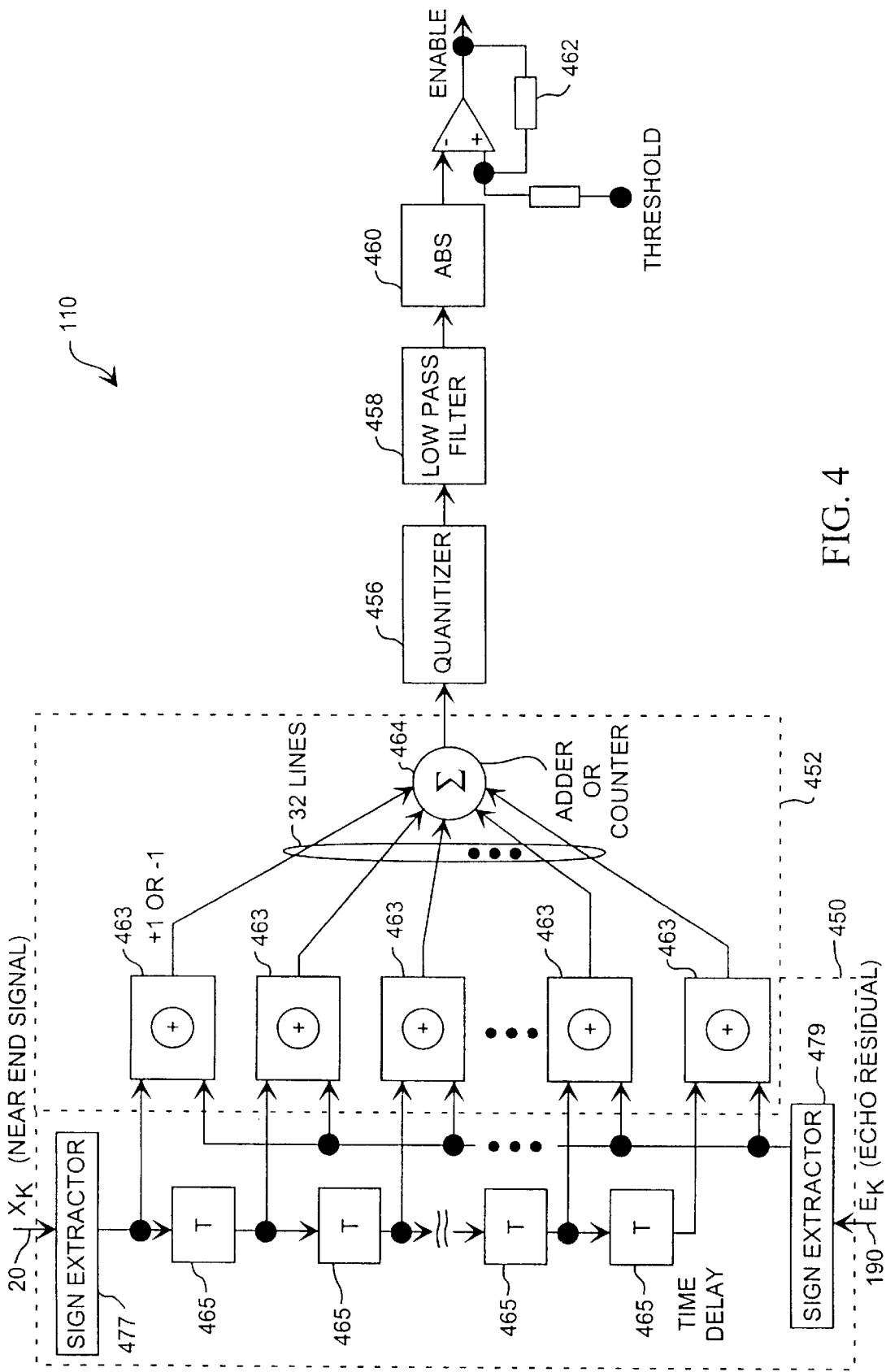
FIG. 4 shows a decorrelation controller according to the invention.

Another feature of the DECT base station unit 30 according to the invention is the decorrelation controller DCR 110. The DCR 110 controls the adaptive balance filter B 90 by detecting the cross correlation between the near-end transmit signal X 20 and the residual error signal E 190. A detailed description of the DCR 110 is shown in FIG. 4.

The DCR 110 consists of a sign register 450, a sign correlator 452, a quantizer 456, a low pass filter 458, an absolute value extractor 460, and a comparator 462. The DCR 110 receives two inputs: the near-end transmit signal X 20, and the residual error signal E 190. The output of the DCR 110, with an adaptive balance filter ON/OFF indication, is fed to the adaptive balance filter B 90, where activation or deactivation of the adaptive balance filter B 90 is thereby controlled. This same signal, but in inverted form, is also fed to an echo suppression controller ESC 140 to turn that function on or off at the appropriate instants in time. By this setup, the echo suppression controller ESC 140 and the adaptive balance filter B 90 are enabled at mutually exclusive time intervals, and cannot both be in an enabling state at the same time.

The DCR 110 and the filter B 90 can be viewed together as a decorrelation machine which uses adaptive control to decorrelate the hybrid echo residual from the signal Y 198 received from the DECT hybrid H 10 by adjusting the tap weights of the adaptive balance filter B 90 based upon the level of correlation between the residual error signal E 190 and the near-end transmit signal X 20. Since the far-end and near-end transmit signals $X_{FE}$ 160, X 20 come from two separate sources, they are likely to be uncorrelated with respect to each other.

The DCR 110 contains a sign register 450 which stores the sign (plus or minus) of the current sample and up to n previous samples coming from the near-end source. In the preferred embodiment, as is shown in FIG. 4, n corresponds to thirty-two, and so there are thirty-two delay elements T 465 in the sign register 450. These delay elements T 465 are implemented by standard digital methods as is known to one of ordinary skill in the art, such as, for example, clocked flip-flops.

The sign of the near-end transmit signal, i.e., +1 or −1, is first extracted by a sign extractor 477 and stored in the register 450. As time passes, the sign bit will be shifted down once for every sample clock T. As a result of this first-in, first-out shifting, the sign register 450 will always store the sign of the most recent n samples x(k), x(k−T), x(k−T−T), . . . , x(k−nT). The n outputs of the sign register 450 are then connected to the inputs of the sign correlator 452, wherein n equals thirty-two in the preferred embodiment. Of course, n can be set to any number of taps while remaining within the scope of the invention.

The sign correlator 452 of the DCR 110 includes an array of n Exclusive-OR gates (XOR) 463 with inputs coming from the sign register 450 and the sign extractor 479 of the current echo residual $E_k$. The output of the n XOR gates 463 are then summed together at the adder 464 to form a sign correlator output. Functionally, the sign correlator 452 performs correlation detection based upon the sign of the current echo residual sample and the sign of the most recent n near-end transmit samples, as shown by the following equation:

$$\text{Correlation value (at } k) = \sum_{n=0}^{31} \{\text{Sign}(E_k) \oplus \text{Sign}(X_{k-nt})\}$$

where $\oplus$ stands for an Exclusive OR (XOR) function with input and output relationships as follows:

| x | y | XOR |
|---|---|---|
| −1 | −1 | −1 |
| −1 | +1 | +1 |
| +1 | −1 | +1 |
| +1 | +1 | −1 |

The sign correlator 452 of the DCR 110 outputs a correlation value between −32 and +32. The quantizer 456 receives the output of the sign correlator 452 and quantizes it to a value of −1 or +1, depending upon the sign of the sign correlation output. In the preferred embodiment, a correlation value of 0 results in a quantized value of +1, but it could just as well be set to −1 while still keeping within the teachings of the invention.

Such quantization is required to ensure a uniform and accurate detection with an input speech signal varying from 200 Hz to 500 Hz due to the fact that low frequency signals tend to have the same sign for a longer period of time than do high frequency signals.

A digital low pass filter 458 of the DCR 110 receives the quantized output from the quantizer 456, and performs a short term integration of the quantized series of +1s and −1s from the quantizer 456. The digital low pass filter 458 smoothes the output and provides a short term averaged correlation value. The digital low pass filter 458 is then followed by an absolute value extractor 460, which strips off the sign from the output of the low pass filter 458 and feeds the unsigned value to a comparator 462.

Comparator 462, characterized by its hysteresis, is included in the DCR 110 to compare the averaged correlation value against a pre-determined threshold. The output of the comparator 462, which indicates the status of the correlation, is then fed to both the adaptive balance filter B 90 and the echo suppression controller ESC 140, for activation or deactivation of these two components.

Based on the decorrelation result, the DCR 110 sends either an enable or disable signal to the balance filter B 90, as can be seen in FIG. 2. If the DCR 110 sends an enable signal to the balance filter B 90, then it will send a disable signal to the echo suppressor controller ESC 140 at the same time. If the DCR 110 sends a disable signal to the balance filter B 90, then it will send an enable signal to the echo suppressor controller ESC 140 at the same time. Therefore, the DCR 110 sends control signals to the echo suppressor controller ESC 140 and the balance filter B 90 to ensure that they do not operate on the residual error signal E 190 at the same time. This is to ensure that the echo suppressor controller ESC 140 is activated only after the balance filter B 90 has converged.

When the DCR 110 determines that the correlation between the near-end transmit signal X 20 and the residual error signal E 190 is above a predetermined threshold level, then the adaptive balance filter B 90 will be allowed to adjust its tap weights in order to eliminate the reflected transmit signal portion $X_{REFL}$ 40 of the residual error signal E 190. During this time of adaptive hybrid echo cancellation, the echo suppressor ES 150 should not be enabled, and the DCR 110 outputs an disable signal to the echo suppressor controller ESC 140 and an enable signal to the balance filter B 90 to ensure that this happens.

This procedure will allow the balance filter B 90 to effectively reach a stable convergence point. When the DCR 110 determines that the correlation between the near-end transmit signal X 20 and the residual error signal E 190 is below the predetermined threshold level, then the adaptive balance filter B 90 has reached a convergence point with respect to elimination of any hybrid echo from the residual error signal E 190. In that case, any more adaptability of the coefficients of the balance filter B 90 will not result in any measurable reduction of hybrid echo from the residual error signal E 190. Since most, if not all, of the hybrid echo has been eliminated from the residual error signal E 190, the only way to eliminate any further echo noise from the residual error signal E 190 is to attenuate, or suppress, that signal.

The DCR 110 effectively handles double talk situations in which there is speech coming in from both the far-end source 50 and the near-end source 5 at the same time. If there was no controlling device such as the DCR 110, the adaptive balance filter B 90 would likely converge to a wrong point, or possibly diverge during double talk conditions. Either of these situations would be undesirable, since the adaptive balance filter B 90 may act to eliminate portions of the far-end receive signal $X_{FE}$ 160 that should not be canceled. The DCR 110 controls the DECT Base Station Unit 30 such that once the adaptive balance filter B 90 has reached its optimum balancing point, the DCR 110 will send it a disable signal, since there would be little if any correlation between the residual error signal E 190 and the near-end transmit signal X 20. Choosing the correct instant in time to stop the adaptation process of the adaptive balance filter B 90 is critical to the effective cancellation of hybrid echo, and the DCR 110 effectively performs this function by a correlation threshold method as described above.

Figure 5:
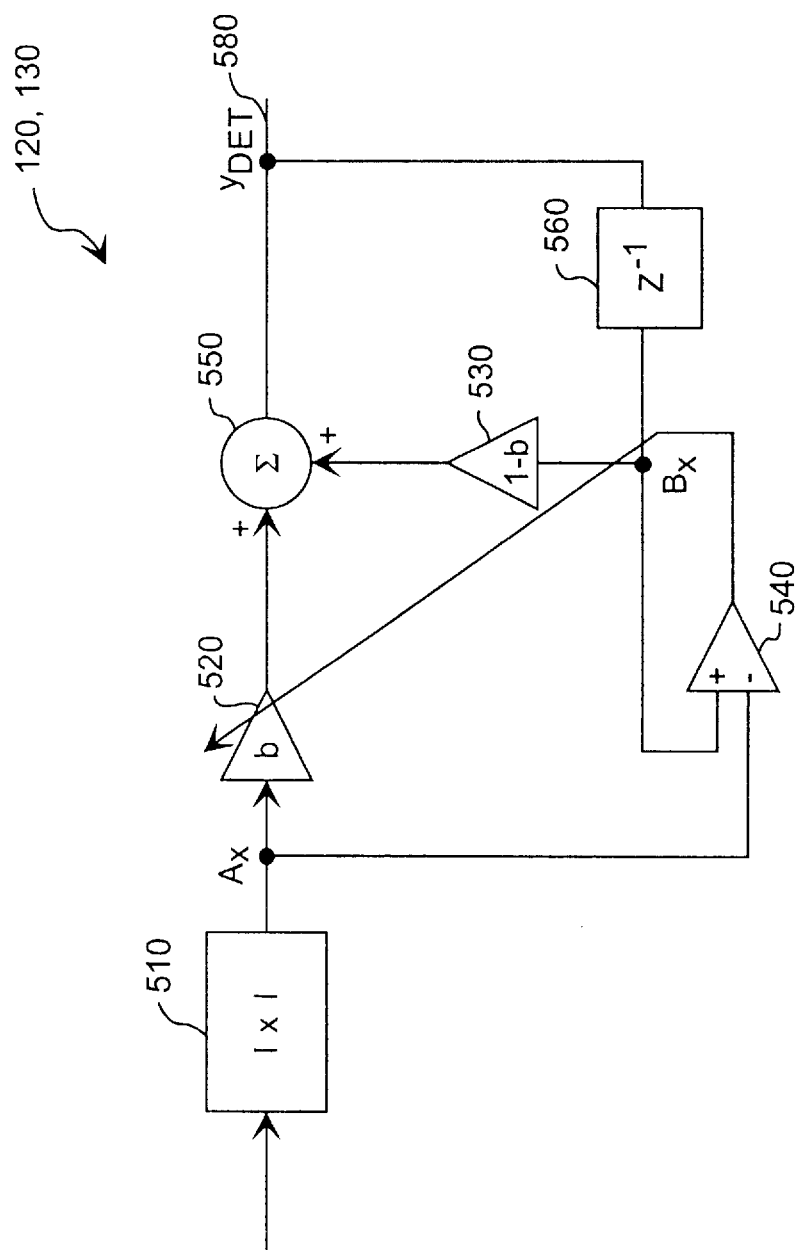
FIG. 5 shows a voice level detector used in the invention.

Referencing FIG. 2, according to the invention, the echo suppressor controller ESC 140 receives a voice detection NES Signal 111 corresponding to the near-end transmit signal X 20 from voice level detector VLD1 120. The ESC 140 also receives a voice detection FES Signal 112 corresponding to the residual error signal E 190 from the voice level detector VLD2 130. Based on these two signals, the ESC 140 determines whether or not to apply any suppression, or attenuation, to the residual error signal E 190. A block diagram of a speech detector that can be used according to the invention as voice level detectors VLD1 120, VLD2 130 is shown in FIG. 5. The speech detector according to the invention includes an absolute value circuit 510, a first amplifier 520, a second amplifier 530, a comparator 540, a summer 550, and a delay circuit 560. The speech detector inputs a speech signal X 20, and outputs a detected signal $Y_{DET}$ 580 based on the following equation:

$$Y_{k+1} = A_{k+1} * b + (1-b) * Y_k,$$

where b=0.25 if A>B, b=0.002 if B>A. The value B is taken at one input of the comparator 540.

Figure 6:
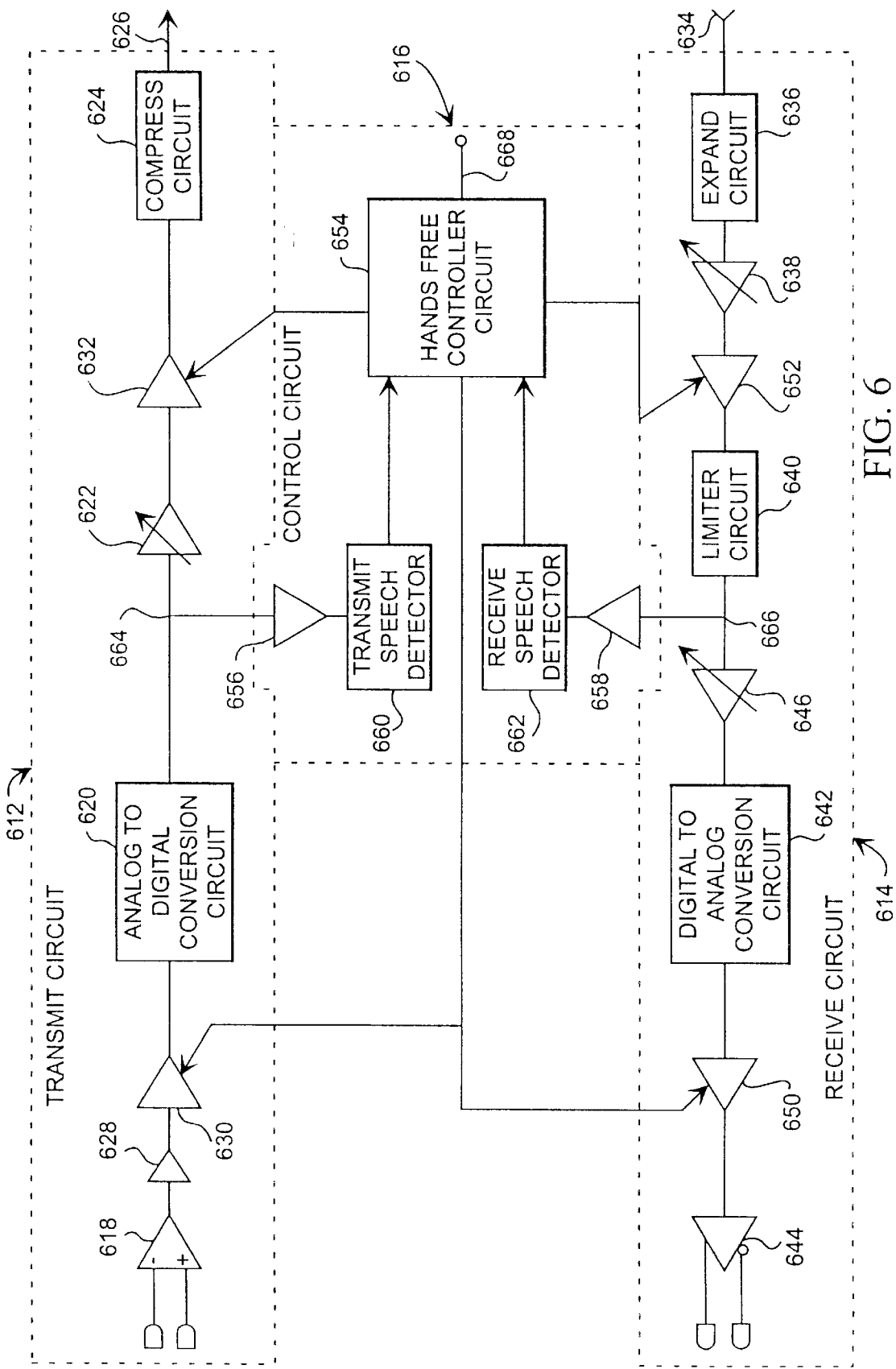
FIG. 6 shows an echo suppression controller according to the invention.

An example of an ESC 150 is the hands-free controller circuit 668 as described in U.S. Pat. No. 5,075,687 and as shown in FIG. 6. The hands-free controller circuit 668 receives a scaled sample of the transmit and receive signal levels, as well as speech or noise signal type indications, from the transmit speech detector 660 and the receive speech detector 662. Based on this information, the hands-free controller circuit 654 determines allocation of losses, or suppression, among the various attenuators 630, 632, 650, 652.

Based on a desired telephone state, i.e., idle, transmit, or receive, an appropriate amount of loss is applied at each of the attenuators 630, 632, 650, 652. In the transmit stable state, attenuators 630 and 632 of the transmit path are set to zero decibel loss, while attenuators 650 and 652 of the receive path are set to a programmable maximum loss. In this manner, the hands-free controller circuit 654 allows the outgoing transmit signal to pass through without any loss, while any incoming signal received at this same time is suppressed to the maximum extent possible.

In the receive stable state, attenuators 630 and 632 of the transmit path are set to the programmable maximum loss, while attenuators 650 and 652 are set to a zero decibel loss.

In the idle stable state, each attenuator 630, 632, 650, 652 is set to one-half the maximum programmable loss, thereby allowing the echo suppression apparatus to be equally disposed to respond to transmit (outgoing) signals and to receive (incoming) signals.

Transitional states are established by the hands-free controller circuit 654 to ensure smooth transitions among the three stable states. During a transition from one state to another state, losses in each attenuator 630, 632, 650, 652 are incremented or decremented appropriately to effect a stable state transition. For example, a series of 1.5 decibel steps can be utilized at 15 millisecond intervals to transition an attenuator from zero dB loss at time t0, to 1.5 dB loss at time t0+15 ms, to 3.0 dB loss at time t0+30 ms, . . . , to 9.0 dB loss at time to +90 ms. During each of these transition steps, the losses in the analog attenuator 630 and analog attenuator 650 always sum to a constant, which happens to be the programmable maximum loss value. The same is true for the losses in digital attenuators 632 and 652. This constant condition guarantees stability during voice switching operations.

This multi-step transition process, also known as soft suppression, in which the attenuation is gradually stepped to an appropriate value to accommodate a new transition state, avoids any undesirable clipping effects on the speech signals transmitted and received during a normal telephone conversation.

This method of performing soft suppression may be performed by a variety of ways, such as, for example, a microprocessor internal to the ESC 140 that sequentially sends appropriate multiple-bit commands to the ES 150 to achieve the desired result. The Hands Free Controller Circuit 668 of FIG. 6 provides such a means for performing soft suppression on receive and transmit signals entering attenuators 632, 652, wherein ES 150 of the preferred embodiment corresponds to one of the attenuators 632, 652.

The ESC 140 according to the invention outputs a control signal to the echo suppressor according to the following table:

| Near-end Speech (NES) | Far-end Speech (FES) | Control (dB) |
| --- | --- | --- |
| No | No | 0 dB |
| No | Yes | 0 dB |
| Yes | No | 0 dB |
| Yes | Yes | 9 dB if NES > FES |

Yes: means speech level above threshold value;
No: means speech level below threshold value.

Each of these four possible states of near- and far-end speech conditions corresponds to an echo suppression condition that must be monitored by the ESC 140. The speech level as determined by the ESC 140 is integrated over a suitable time period, for example, 140 milliseconds. Based on a current echo suppression condition as determined by the ESC 140 from receiving inputs from the first and second voice level detectors VLD1 120, VLD2 130, the ESC 140 will send an appropriate control signal to the echo suppressor ES 150 to ensure that the proper amount of suppression is applied to the residual error signal E 190 by the echo suppressor ES 150.

The various situations shown in the above table mean that the ESC 140 will only send a control signal to the echo suppressor ES 150 to perform echo suppression on the residual error signal E 190 when the VLD1 120 detects Near-end Speech over a predetermined threshold and VLD2 detects Far-end Speech over a predetermined threshold, AND the Near-end Speech is greater than the Far-end Speech. Referring now to FIG. 2, in this circumstance, both the first and the second voice level detectors VLD1 120, VLD2 130 have detected the presence of a signal. There are two possibilities in this case, as given below.

Case 1. Single talk with long echo delay

Since the balance filter B 90 is not able to cancel the long network echo, as described previously herein, the network echo will pass through the summer S 100 without any attenuation, thereby resulting in a detection of a high FES Signal 112 by the second voice level detector VLD2 130. At the same time, the first voice level detector VLD1 120 will also detect a high NES signal 111 due to the long decay time of the near-end speech. In this case, the echo supressor ES 150 should perform suppression under the condition that the near-end speech must be larger than the far-end speech because the network echo will never exceed the original near-end transmit signal.

Case 2. Double talk

If the FES signal 112 is larger than the NES signal 111, there is a strong likelihood that both the near-end source 5 and the far-end source 50 are talking at the same time. In this case, the echo suppressor ES 150 should be inhibited to avoid attenuating the receive far-end speech $X_{FE}$ 160.

For example, when the ESC 140 detects the condition in which the echo supressor ES 150 is to be set to 9 dB of attenuation, this is done gradually. For example, the ESC 140 can send a series of control signals to set the echo suppressor to 1.5 dB attenuation at time t0, set echo suppressor to 3.0 dB at time t0+15 msec, set echo suppressor to 4.5 dB at time t0+30 msec, . . . , set echo suppressor to 9.0 dB at time t0+90 msec. Essentially, the attenuation of the echo suppressor ES 150 is commanded by the ESC 140 to be stepped up from 0 dB to 9 dB, in 1.5 dB increments every 15 milliseconds. This type of gradual suppression eliminates any undesirable clipping in the return speech, and allows for better fidelity in the return speech signal.

This type of "soft suppression" can be performed by either analog means or digital means, as is known to one of ordinary skill in the art. To effect soft suppression, the ESC 140 sends gradual suppression commands to the echo suppressor, as described above.

When the echo suppressor ES 150 is to be changed from 9 dB suppression to 0 dB suppression, the same gradual attenuation change will be effected to ensure that no clipping takes place. Note that the time for changing the attenuation level is approximately the maximum time that a network echo would occur, which is an important feature of the control signals to be sent from the ESC 140 to the ES 150. The output of the ES 150 is then sent over-the-air to the near-end source 5, which in the preferred embodiment is the DECT Mobile Handset Unit 5. The signal received by the near-end source 5 will have had any long duration and any short duration echoes removed from it by the DECT base station unit 30.

FIG. 7A shows test results using the embodiment of the invention as shown in FIG. 2. Tests were performed with various noise types and levels being inserted into the four-wire and two-wire loops. The incoming signal level was varied in steps of −5 dBm0, −10 dBm0, −20 dBm0, and −30 dBm0. Based on these excitation signal levels, the amount of noise received by the near-end source was measured with respect to these near-end transmit signal levels.

Noise was input as either: 1) G.227 Telephone noise (mid-band), which is weighted noise that is similar to speech, (FIG. 7B) 2) Singing Return Loss (SRL)—Low Band (200–500 Hz) (FIG. 7C), and 3) SRL—High Band (2500–3400 Hz) (FIG. 7D). The terminating loop condition was: 1) 600 ohm impedance, 2) EIA3 Loop standard, and 3) EIA5 Loop standard. The results for each of these noise cases performed with each of the terminating loop conditions, as listed in FIG. 7A, reveal that the noise level was always at least 23 dB below the excitation signal level.

While embodiments of the invention have been described herein, modifications of the described embodiments may become apparent to those of ordinary skill in the art, following the teachings of the invention, without departing from the scope of the invention as set forth in the appended claims.

What is claimed is:

1. An echo suppressor controller device in a base station unit, comprising:

a hybrid connecting a two-wire loop to a four-wire loop, said hybrid having a first port for receiving a first transmit signal from a near-end source, a second port for outputting said first transmit signal to said two-wire loop and for receiving a second transmit signal from a far-end source, and a third port for outputting said second transmit signal to said two-wire loop, wherein an impedance mismatch between said two-wire loop and said four-wire loop results in reflection of said first transmit signal to said near-end source through said third port;

an adder/subtracter having an addition input, a subtraction input connected to receive said output from said third port of said hybrid, and an output port for outputting a residual error signal;

an adaptive balance filter having a first input port connected to receive said first transmit signal, a second input port connected to receive said residual error signal, an enable port, and an output port for outputting a balance signal based on a correlation determined therein between said first transmit signal and said residual error signal;

a decorrelation controller having a first input port connected to receive said first transmit signal, a second input port connected to receive said residual error signal, and outputting a first control signal to said enable port of said adaptive balance filter to control adaptation by said adaptive balance filter based on a level of correlation of said first transmit signal and said residual error signal as determined by said decorrelation controller, and outputting a second control signal in reverse polarity to said first control signal;

a first and second voice level detector respectively connected to receive said first transmit signal and said residual error signal, said first and second voice level detectors respectively outputting a first and second voice detection level;

an echo suppressor controller having a first and second input respectively connected to said first and second voice level detectors, said echo suppressor controller having an enable input for receiving said second control signal, and outputting an echo suppression control signal according to said first and second voice detection levels respectively received from said first and second voice level detectors; and an echo suppressor having a first input port for receiving said echo suppression control signal, a second input port for receiving said residual error signal, and an output port for outputting an attenuated residual error signal according to an attenuation level as determined from said echo suppression control signal received from said echo suppression controller.

2. An echo suppressor controller device as recited in claim 1, wherein said adaptive balance filter is a finite impulse response filter.

3. An echo suppressor controller device as recited in claim 1, wherein said means for measuring a level of correlation comprises:

means for determining a sign of said stripped-off signal and a sign of said transmit signal; and a multiplier for multiplying said sign of said stripped-off signal by said sign of said transmit signal and outputting a level of correlation as a result thereof.

4. An echo suppressor controller device as recited in claim 1, wherein said echo suppressor controller comprises means for sending a sequential series of commands to said echo suppressor to increase said attenuation level of said echo suppressor at a constant rate over a predetermined time period.

5. An echo suppressor controller device as recited in claim 1, wherein said decorrelation controller sends said first control signal to enable said adaptive balance filter only when said echo suppressor controller is in a disabled state, and said decorrelation controller sends said second control signal to enable said echo suppressor controller only when said adaptive balance filter is in a disabled state.

6. An echo suppressor controller device as recited in claim 1, wherein said echo suppressor has an attenuation range of from 0 dB to 9 dB.

7. An echo suppressor controller as recited in claim 1, wherein said decorrelation controller comprises a tap delay line filter.

8. An echo suppressor controller as recited in claim 7, wherein said tap delay line filter comprises thirty-two taps.

9. An echo suppressor controller as recited in claim 1, wherein said echo suppression controller comprises means for sequentially sending said echo suppression control signal to said echo suppressor only when said echo suppression controller determines that said first and second transmit signals are being received at a same time and said first transmit signal is greater than said second transmit signal.

10. An echo suppressor controller as recited in claim 1, wherein said echo suppression controller comprises means for sequentially sending said echo suppression control signal to said echo suppressor in order to change said attenuation level of said echo suppressor at a constant rate over a predetermined time period.

11. An echo suppressor controller device in a base station unit, comprising:

connecting means for connecting a two-wire loop to a four-wire loop, said connecting means having a first port for receiving a first transmit signal from said four-wire loop, a second port for outputting said first transmit signal to said two-wire loop and for receiving a second transmit signal from said two-wire loop, a third port for outputting an output signal which includes said second transmit signal to said four-wire loop, wherein an impedance mismatch between said two-wire loop and said four-wire loop results in some of said first transmit signal being output through said third port and included in said output signal;

an adaptive balance filter having a first input port connected to receive said first transmit signal, a second input port connected to receive an error signal, and having an output port for outputting a balance signal based on a correlation between said first transmit signal and said error signal;

means for adding said balance signal to said output signal and outputting said error signal as a result thereof;

a decorrelation controller having a first input port connected to receive said first transmit signal, a second input port connected to receive said output signal, and outputting a first control signal to said adaptive balance filter to control adaptation by said adaptive balance filter based on a level of correlation of said first transmit signal and said error signal;

a first and second voice level detector respectively connected to receive said first transmit signal and said residual error signal, said first and second voice level detector respectively outputting a first and second voice detection level;

an echo suppressor controller having a first and second input respectively connected to said first and second voice level detector, said echo suppressor controller having an enable input for receiving said first control signal, and outputting an echo suppression control signal according to said first and second voice detection level respectively received from said first and second voice level detectors; and an echo suppressor having a first input port for receiving said echo suppression control signal, a second input port for receiving said residual error signal, and an output port for outputting an attenuated residual error signal according to an attenuation level as determined from said echo suppression control signal received from said echo suppression controller.

12. An echo suppressor controller device as recited in claim 11, wherein said adaptive balance filter comprises a finite impulse response filter.

13. An echo suppressor controller device as recited in claim 11, wherein said decorrelation controller comprises:

means for determining a sign of said stripped-off signal and a sign of said transmit signal; and a multiplier for multiplying said sign of said stripped-off signal by said sign of said transmit signal and outputting a level of correlation as a result thereof.

14. An echo suppressor controller as recited in claim 11, wherein said echo suppression controller comprises means for sequentially sending said echo suppression control signal to said echo suppressor to change said attenuation level of said echo suppressor at a constant rate over a predetermined time period.

15. An echo suppressor controller as recited in claim 11, wherein said control signal can have one of a first level and a second level at a time, and wherein said decorrelation controller sends said control signal having said first level to said adaptive balance filter and said echo suppressor controller at a same time, thereby enabling said adaptive balance filter and disabling said echo suppressor controller, and said decorrelation controller sends said control signal having said second level to said adaptive balance filter and said echo suppressor controller at a same time, thereby disabling said adaptive balance filter and enabling said echo suppressor controller.

16. An echo suppressor controller as recited in claim 11, wherein said echo suppressor has an attenuation range of from 0 dB to 9 dB.

17. An echo suppressor controller as recited in claim 11, wherein said decorrelation controller comprises a tap delay line filter.

18. An echo suppressor controller as recited in claim 11, wherein said echo suppression controller outputs said echo suppression control signal to said echo suppressor only when said echo suppression controller determines that said first and second transmit signals are being received at a same time and said first transmit signal is greater than said second transmit signal.

19. An echo suppressor controller as recited in claim 11, wherein said echo suppression controller comprises means for sending a sequential series of commands to said echo suppressor to increase said attenuation level of said echo suppressor at a constant rate over a predetermined time period.

20. An echo suppressor as recited in claim 5, wherein when the level of correlation exceeds a first predetermined threshold at a same time first and second voice detection levels indicate a second predetermined threshold being exceeded in both said first transmit signal and said residual error signal, said decorrelation controller outputs said first control signal and said second control signal so as to activate said adaptive balance filter and to deactivate said echo suppressor.

21. An echo suppressor as recited in claim 15, wherein when the level of correlation exceeds a first predetermined threshold at a same time first and second voice detection levels indicate a second predetermined threshold being exceeded in both said first transmit signal and said residual error signal, said decorrelation controller outputs said first control signal and said second control signal so as to activate said adaptive balance filter and to deactivate said echo suppressor.

* * * * *